United States Patent [19]

Maschmeyer

[11] Patent Number: 5,529,963

[45] Date of Patent: Jun. 25, 1996

[54] PROCESS FOR THE REGENERATION OF A DEACTIVATED, CARBON-COVERED, FINE-GRAINED, HEAT-RESISTANT CATALYST

[75] Inventor: Dietrich Maschmeyer, Marl, Germany

[73] Assignee: Huels Aktiengesellschaft, Marl, Germany

[21] Appl. No.: 217,865

[22] Filed: Mar. 25, 1994

[30] Foreign Application Priority Data

Jun. 1, 1993 [DE] Germany .......................... 43 18 095.7

[51] Int. Cl.⁶ ................................................ B01J 20/34
[52] U.S. Cl. ................... 502/20; 502/38; 502/30; 502/41
[58] Field of Search .................. 502/38, 20, 41, 502/41, 30

[56] References Cited

U.S. PATENT DOCUMENTS

| | | | |
|---|---|---|---|
| 1,873,998 | 8/1932 | Davis | 502/38 |
| 2,939,844 | 6/1960 | Ellinger . | |
| 4,388,216 | 6/1983 | Westernacher et al. | 502/38 |
| 4,975,399 | 12/1990 | Gardner | 502/38 |
| 5,248,408 | 9/1993 | Owen . | |

*Primary Examiner*—Asok Pal
*Attorney, Agent, or Firm*—Oblon, Spivak, McClelland, Maier & Neustadt

[57] ABSTRACT

The invention relates to a process for the regeneration of a deactivated, carbon-covered, fine-grained, heat-resistant catalyst, a pumpable suspension of deactivated catalyst being injected into a hot gas stream and the regenerated catalyst then being separated off from the gas stream.

13 Claims, No Drawings

PROCESS FOR THE REGENERATION OF A DEACTIVATED, CARBON-COVERED, FINE-GRAINED, HEAT-RESISTANT CATALYST

BACKGROUND OF THE INVENTION

1. Field of the Invention

The present invention relates to a process for regenerating a deactivated, carbon-covered, fine-grained, heat-resistant catalyst.

The invention relates in particular to a process for regenerating a fine-grained, heat-resistant suspension catalyst.

2. Discussion of the Background

The regeneration of catalysts, in particular suspension catalysts, which are used as fine particles for the catalysis of reactions of various types, is frequently extremely difficult. Reduction catalysts, such as Raney nickel, can generally only be regenerated by the metallurgical process. In contrast, oxidic catalysts can often be regenerated by burning off the deposited carbon and thus restoring, at moderate temperatures, the original surface and pore structure of the catalysts. However, such regeneration processes are frequently difficult to carry out due to the high reactivity of the finely divided components. Self-ignition and self-accelerating chemical reactions can occur if the regeneration is not precisely performed.

For example, during the preparation of 1,4-butynediol, an important precursor in the preparation of 1,4-butanediol, from acetylene and formaldehyde by the Reppe process, a catalyst has long been used which is essentially composed of copper oxide and bismuth oxide on a magnesium-silicate-based support. During use, this catalyst accumulates polymers and is thereby deactivated. This catalyst is conventionally regenerated to virtually completely restored activity by burning off the carbon coverings thus formed. However, during the regeneration, the fine-grained, dry, carbon-covered catalyst can self-ignite and dust explosions can occur.

SUMMARY OF THE INVENTION

Accordingly, one object of the present invention is to provide a process for the regeneration of a deactivated, carbon-covered, fine-grained, heat-resistant catalyst which is safe and with which there is no risk either of self-ignition of the catalyst or of a dust explosion.

It has now surprisingly been found that a deactivated, carbon-covered, fine-grained, heat-resistant catalyst can be completely regenerated by injecting a pumpable suspension of the deactivated catalyst into a hot gas stream and then separating off the regenerated catalyst from the gas stream. Self-ignition of the catalyst and dust explosions are excluded from this process.

DETAILED DESCRIPTION OF THE PREFERRED EMBODIMENTS

The present invention provides a novel process for the regeneration of a deactivated, carbon-covered, fine-grained, heat-resistant catalyst, comprising injecting a pumpable suspension of the deactivated catalyst into a hot gas stream and subsequently separating off the regenerated catalyst from the gas stream.

The process according to the invention is particularly advantageous for the regeneration of a deactivated suspension catalyst, since in this case, the catalyst is already present in suspension.

In the process according to the invention, the regenerated catalyst can be separated off dry from the gas stream or it can be scrubbed out from the gas stream with formation of a suspension.

Deactivated catalysts suitable for regeneration according to the present invention preferably have a mean particle size between 1 μm and 300 μm.

Catalysts termed "heat-resistant" are those which do not lose their catalytic activity during thermal treatment.

Suitable heat-resistant catalysts useful in accordance with the present invention include metal oxides, noble metals and ceramic materials.

The process according to the invention is very particularly advantageous for the regeneration of a copper- and bismuth-containing suspension catalyst for the reaction of formaldehyde with acetylene to give 1,4-butynediol. This suspension catalyst can, for example, contain copper and bismuth on an inert support. The mean particle size of the copper- and bismuth-containing suspension catalyst should suitably be between 5 μm and 100 μm.

The process according to the invention can be particularly advantageously carried out if the hot gas stream, into which the suspension of the deactivated catalyst is injected, is in a turbulent flow state.

The oxygen content of the hot gas stream is preferably 5 to 20% by volume, particularly preferably 8 to 12% by volume.

The temperature of the hot gas stream is preferably 300° to 1050° C., particularly preferably 600° to 850° C.

The residence time of the deactivated catalyst in the hot gas stream is preferably 0.01 to 10 sec, particularly preferably 0.1 to 2 sec.

The process of the present invention can suitably be carried out as follows: A pumpable suspension of the deactivated catalyst is continuously injected into an oxygen-containing, turbulent, preheated gas stream having a temperature of about 700° to 900° C. The water evaporates very rapidly. Immediately thereafter, at a temperature of about 120° C., a sudden degassing of the deactivated catalyst takes place. The escaping gas burns immediately and reheats the gas stream which has lost heat by the evaporation of water. A very rapid burning off of the carbon compounds in the grain of the catalyst then takes place, since the catalyst particles are freely suspended in the gas stream and the gas exchange proceeds extremely rapidly. By equally rapid release of the energy of the particles to the gas stream, via heat conduction and particle impact, overheating of the particles, as could occur in the case of uncontrolled oxygen feed to a packed bed of catalyst material as a result of heat transmission by radiation, is reliably prevented. The particles are then separated off from the gas stream. It is possible to insert a further step for heat recovery, for example for preheating the combustion air.

The regeneration according to the invention of a deactivated catalyst can be carried out, for example, in a TURBULATOR (an apparatus available from by the Maurer und Söhne company for the thermal treatment of waste materials). In such an apparatus, an annular channel is impinged tangentially by a hot gas from a burner. The hot gas flows from the annular channel through vanes into the interior and in the course of this is set in rapid circulation.

The circulating hot gas travels upwards in a spiral motion along the walls in the actual turbulator chamber. As a result of the high gas velocity at the bottom, a part-stream is sucked back into the center where it mixes with fresh hot gas. The suspension of the deactivated catalyst is injected into this central backflow via a sprayance furnished with a water cooling jacket and having a two-component nozzle. Because of the high gas velocities and turbulences achieved after a short pathway, the catalyst particles are very finely distributed, the water evaporates virtually instantaneously and the burning off of the carbon covering on the catalyst particles proceeds extremely rapidly as a result of the minimized mass transport influence. At the same time, good heat exchange is ensured between the hot gas and the catalyst particles. The temperatures are measured in the clean, hot gas in the annular channel and at the outlet of the turbulator. Air can be additionally added into the turbulator chamber by a further annular channel. An inspection glass permits observation of the flame vortex.

The exhaust gas stream passes through a delay time section of generally approximately 3 m in length. The first separation of burnt-out, regenerated catalyst particles then proceeds in a hot cyclone. The exhaust gas is then cooled via an air preheater before the exhaust gas is freed from the residual catalyst particles by circulating water in a venturi scrubber and is conducted away into the stack by a downstream suction fan. The current oxygen content of the exhaust gas is measured there via an oxygen analyzer.

Having generally described this invention, a further understanding can be obtained by reference to certain specific examples which are provided herein for purposes of illustration only and are not intended to be limiting unless otherwise specified.

EXAMPLE

The regeneration of a deactivated, carbon-covered suspension catalyst, containing 40% by weight CuO and 2% by weight of $Bi_2O_3$, having magnesium silicate as support material with a mean catalyst particle size of 25 μm and a carbon content of 0.95 g of C/g of catalyst is carried out in a TURBULATOR (available from the Maurer und Söhne company) having an incineration chamber volume of approximately 30 l. The adjustment of the burners, including the air factor, the additional air and the amount of the suspension to be injected to be added is carried out with observation of the turbulator chamber through the inspection glass and of the two measured temperatures of the hot gas in the annular channel and at the outlet of the turbulator. The suspension to be injected, to improve the pumpability, is prepared by diluting the viscous and highly dilatant suspension of the deactivated catalyst from about 20 to 10% by weight solids content. The spraying nozzle has an orifice with a diameter of 2.5 mm.

The burner output is set to about 12 kW and the air excess is about 80%. Additional air is fed as sprayed air. The oxygen content in the exhaust gas is adjusted via the feed of combustion air, similarly preheated, into the turbulator chamber through side nozzles.

Approximately 30 to 40 l/h of suspension are metered in via a high-speed peristaltic pump. The spraying air pressure is in this case approximately 1 bar gauge pressure; the liquid pressure upstream of the nozzle is approximately 0.5 bar gauge pressure. The input temperature of the hot gas downstream of the burner in the annular channel is approximately 950° C.

Because of the intense cooling of the input gas and because of the high oxygen consumption by the injected suspension, temperatures of the hot gas at the outlet of the turbulator of 600° to 850° C. are set by regulating the catalyst suspension feed and oxygen contents from 6 to 14% by volume. To generate sufficient turbulence of the gas stream, a gas feed of 60–120 $m^3$ (S.T.P.)/h is required. Within the above-mentioned temperature range and at the above-mentioned oxygen contents of the hot gas, equally good results with respect to the regeneration of the catalyst can be achieved.

At the spraying air pressure (see above) set, the injected suspension is very finely distributed. Drops cannot be observed on the furnace wall. A mist vortex forms at the bottom of the turbulator chamber. The furnace wall shows dull red heat.

Energetic analysis shows that in this operating state more than 50% of the energy required is obtained by the combustion of the organic constituents of the diluted catalyst suspension (10% by weight solids content of the catalyst suspension). However, with an improved pump system, higher solids contents are possible in the suspension, so that the additional energy requirement can be reduced to 25% of the total process energy. The process according to the invention thus permits a very much more extensive utilization of the resulting waste heat than the "dry" regeneration processes according to the prior art, in which utilization of the waste heat of only 10% at maximum is possible.

The samples taken off of the catalyst regenerated according to the invention show decreasing residual carbon contents with increasing temperature of the hot gas at the outlet of the turbulator. At a temperature of 600° C., the residual carbon content of the regenerated catalyst is 0.02 g of C/g of catalyst, and at a temperature of 800° C., a residual carbon content of 0.0018 g of C./g of catalyst is achieved, without traces of sintering in the catalyst grain being shown. The catalyst regenerated according to the invention has the same activity as a catalyst regenerated according to the prior art.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the regeneration of a deactivated, carbon-covered, suspension catalyst, comprising:

injecting a pumpable liquid suspension of a deactivated catalyst having a mean particle size of between 1 μm and 300 μm into a gas stream at from 600° to 1050° C. to regenerate said catalyst, and separating off the regenerated catalyst from the gas stream, wherein the residence time of said deactivated catalyst in said qas stream is from 0.01 to 10 sec.

2. The process according to claim 1, wherein said regenerated catalyst is separated off dry from the gas stream.

3. The process according to claim 1, wherein said regenerated catalyst is scrubbed out from the gas stream forming a suspension.

4. The process according to claim 1, wherein said catalyst is a copper- and bismuth-containing suspension catalyst for the reaction of formaldehyde with acetylene to give 1,4-butynediol.

5. The process according to claim 4, wherein said catalyst contains copper and bismuth on an inert support.

6. The process according to claim 4, wherein the mean particle size of said copper- and bismuth-containing suspension catalyst is between 5 μm and 100 μm.

7. The process according to claim 1, wherein said gas stream is in a turbulent flow state.

8. The process according to claim 1, wherein the oxygen content of said gas stream is of from 5 to 20% by volume, based on the total volume of said hot gas stream.

9. The process according to claim 8, wherein the oxygen content of said gas stream is of from 8 to 12% by volume, based on the total volume of said hot gas stream.

10. The process according to claim 1, wherein the temperature of said hot gas stream is of from 600° to 850° C.

11. The process according to claim 1, wherein the residence time of said deactivated catalyst in said gas stream is of from 0.1 to 2 sec.

12. The process of claim 1, wherein said liquid suspension is an aqueous suspension.

13. The process of claim 1, wherein said liquid suspension contains 20 to 10% by weight solids.

* * * * *